United States Patent
Cho et al.

(10) Patent No.: US 9,601,754 B2
(45) Date of Patent: Mar. 21, 2017

(54) NEGATIVE ACTIVE MATERIAL FOR RECHARGEABLE LITHIUM BATTERY, METHOD OF PREPARING SAME, AND NEGATIVE ELECTRODE AND RECHARGEABLE LITHIUM BATTERY INCLUDING SAME

(71) Applicant: Samsung SDI Co., Ltd., Yongin-si, Gyeonggi-do (KR)

(72) Inventors: Yu-Jeong Cho, Yongin-si (KR);
Hyun-Ki Park, Yongin-si (KR);
Sang-Hyuck Ahn, Yongin-si (KR);
Deok-Hyun Kim, Yongin-si (KR);
Xianhui Meng, Yongin-si (KR);
Su-Kyung Lee, Yongin-si (KR);
Yeon-Gap Kim, Yongin-si (KR);
Young-Jin Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 224 days.

(21) Appl. No.: 14/333,433

(22) Filed: Jul. 16, 2014

(65) Prior Publication Data
US 2015/0056510 A1   Feb. 26, 2015

(30) Foreign Application Priority Data

Aug. 20, 2013 (KR) ........................ 10-2013-0098724

(51) Int. Cl.
*H01M 4/13* (2010.01)
*H01M 4/36* (2006.01)
(Continued)

(52) U.S. Cl.
CPC ........... *H01M 4/134* (2013.01); *H01M 4/131* (2013.01); *H01M 4/1391* (2013.01);
(Continued)

(58) Field of Classification Search
CPC .. H01M 4/0202; H01M 4/134; H01M 4/1395; H01M 4/366; H01M 4/386; H01M 4/485; H01M 4/587
See application file for complete search history.

(56) References Cited

U.S. PATENT DOCUMENTS 8,057,710 B2   11/2011   Lee et al.
8,298,707 B2   10/2012   Tanaka et al.
(Continued)

FOREIGN PATENT DOCUMENTS

JP   2000-090922 A   3/2000
KR   2003-0096089   12/2003
(Continued)

OTHER PUBLICATIONS

Korean Patent Abstracts No. 10-2010-0109483 A for Patent No. KR 10-1194953 B1, Oct. 8, 2010, 2 Pages.
(Continued)

*Primary Examiner* — Kenneth Douyette
(74) *Attorney, Agent, or Firm* — Lewis Roca Rothgerber Christie LLP

(57) ABSTRACT

Disclosed are a negative active material for a rechargeable lithium battery including a silicon-based material including $SiO_x$ particles, where $0<x<2$, and a Si—Fe—containing alloy positioned on the surface of the $SiO_x (0<x<2)$ particles, a method of preparing the same, and a negative electrode and a rechargeable lithium battery including the same.

13 Claims, 3 Drawing Sheets

(51) Int. Cl.
*H01M 4/48* (2010.01)
*H01M 4/134* (2010.01)
*H01M 4/38* (2006.01)
*H01M 4/1395* (2010.01)
*H01M 4/131* (2010.01)
*H01M 4/1391* (2010.01)
*H01M 4/485* (2010.01)

(52) U.S. Cl.
CPC ......... *H01M 4/1395* (2013.01); *H01M 4/366* (2013.01); *H01M 4/386* (2013.01); *H01M 4/485* (2013.01); *Y02E 60/122* (2013.01)

(56) References Cited

U.S. PATENT DOCUMENTS

2004/0033419 A1* 2/2004 Funabiki ............... C01B 33/113
429/218.1
2009/0004564 A1* 1/2009 Ishida .................... B82Y 30/00
429/219
2009/0004566 A1* 1/2009 Shirane ................. H01M 4/133
429/220
2012/0082895 A1* 4/2012 Kimura ................. H01M 4/364
429/220

FOREIGN PATENT DOCUMENTS

| KR | 10-2008-0100500 A | 11/2008 |
| KR | 10-2012-0069535 | 6/2012 |
| KR | 10-1194953 B1 | 10/2012 |

OTHER PUBLICATIONS

KIPO Office Action dated Jan. 24, 2017, for corresponding Korean Patent Application No. 10-2013-0098724 (5 pages).

* cited by examiner

NEGATIVE ACTIVE MATERIAL FOR RECHARGEABLE LITHIUM BATTERY, METHOD OF PREPARING SAME, AND NEGATIVE ELECTRODE AND RECHARGEABLE LITHIUM BATTERY INCLUDING SAME

CROSS-REFERENCE TO RELATED APPLICATION

This application claims priority to and the benefit of Korean Patent Application No. 10-2013-0098724 filed in the Korean Intellectual Property Office on Aug. 20, 2013, the entire content of which is incorporated herein by reference.

BACKGROUND

1. Field

A negative active material for a rechargeable lithium battery, a method of preparing the same, and a negative electrode and a rechargeable lithium battery including the same are disclosed.

2. Description of the Related Art

Rechargeable lithium batteries have recently drawn attention as a power source for small portable electronic devices. Rechargeable lithium batteries use an organic electrolyte and thereby have twice or more of the discharge voltage than that of a conventional battery using an alkaline aqueous solution, and accordingly have high energy density.

A rechargeable lithium battery is usually manufactured by injecting an electrolyte into an electrode assembly, which typically includes a positive electrode including a positive active material capable of intercalating/deintercalating lithium ions and a negative electrode including a negative active material capable of intercalating/deintercalating lithium ions.

As for negative active materials of a rechargeable lithium battery, various carbon-based materials such as artificial graphite, natural graphite, and hard carbon have been used. Recently, a non-carbon-based negative active material such as silicon (Si) has been researched to determine whether it meets the demands for stability and high-capacity.

SUMMARY

One embodiment of the present invention provides a negative active material for a rechargeable lithium battery having high capacity and excellent cycle-life and efficiency characteristics.

Another embodiment provides a method of preparing the negative active material for a rechargeable lithium battery.

Yet another embodiment provides a negative electrode including the negative active material for a rechargeable lithium battery.

Still another embodiment provides a rechargeable lithium battery including the negative electrode.

One embodiment provides a negative active material for a rechargeable lithium battery including silicon-based material including $SiO_x$ (0<x<2) particles and a Si—Fe-containing alloy positioned on the surface of the $SiO_x$ (0<x<2) particles.

The Si—Fe-containing alloy may be positioned on the surface of the $SiO_x$ (0<x<2) particles in a discontinuous form.

The silicon-based material may include about 20 wt % to about 95 wt % of the $SiO_x$ (0<x<2) particles, and about 5 wt % to about 80 wt % of the Si—Fe-containing alloy, and in some embodiments about 50 wt % to about 80 wt % of the $SiO_x$ (0<x<2) particles, and about 20 wt % to about 50 wt % of the Si—Fe-containing alloy.

The $SiO_x$ (0<x<2) particles may be amorphous.

An average particle diameter of the $SiO_x$ (0<x<2) particles may be from about 1 μm to about 70 μm.

The Si—Fe-containing alloy may include a Si—Fe alloy, a Si—Fe—O alloy, a Si—Fe—Cu alloy, a Si—Fe—Sn alloy, a Si—Fe—Al alloy, a Si—Ti—Fe alloy, a Si—Ti—Ni—Fe alloy, a Si—Ti—Ni—Cu—Fe alloy, a Si—Fe—C alloy, a Si—Fe—Cu—C alloy, a Si—Fe—Sn—C alloy, or a combination thereof.

A particle size of the silicon-based material may be from about 3 μm to about 70 μm.

The negative active material may further include a carbon-based material.

The silicon-based material may be included in an amount of about 1 wt % to about 99 wt % based on the total amount of the negative active material.

The Si—Fe-containing alloy further includes Si particles.

Another embodiment provides a method of preparing a negative active material for a rechargeable lithium battery that includes mixing $SiO_x$ (0<x<2) particles and a Si—Fe-containing alloy using a mechanical alloying method, to prepare a silicon-based material including the Si—Fe-containing alloy positioned on the surface of the $SiO_x$ (0<x<2) particles.

The silicon-based material may be prepared by mixing about 20 wt % to about 95 wt % of the $SiO_x$ (0<x<2) particles, and about 5 wt % to about 80 wt % of the Si—Fe-containing alloy, and in some embodiments about 50 wt % to about 80 wt % of the $SiO_x$ (0<x<2) particles, and about 20 wt % to about 50 wt % of the Si—Fe-containing alloy.

Yet another embodiment provides a negative electrode for rechargeable lithium battery including the negative active material.

Still another embodiment provides a rechargeable lithium battery including the negative electrode, a positive electrode, and an electrolyte.

Other embodiments are included in the following detailed description.

A negative active material for a rechargeable lithium battery according to embodiments of the present invention has high capacity and excellent cycle-life and efficiency characteristics.

DETAILED DESCRIPTION

Figure 1:
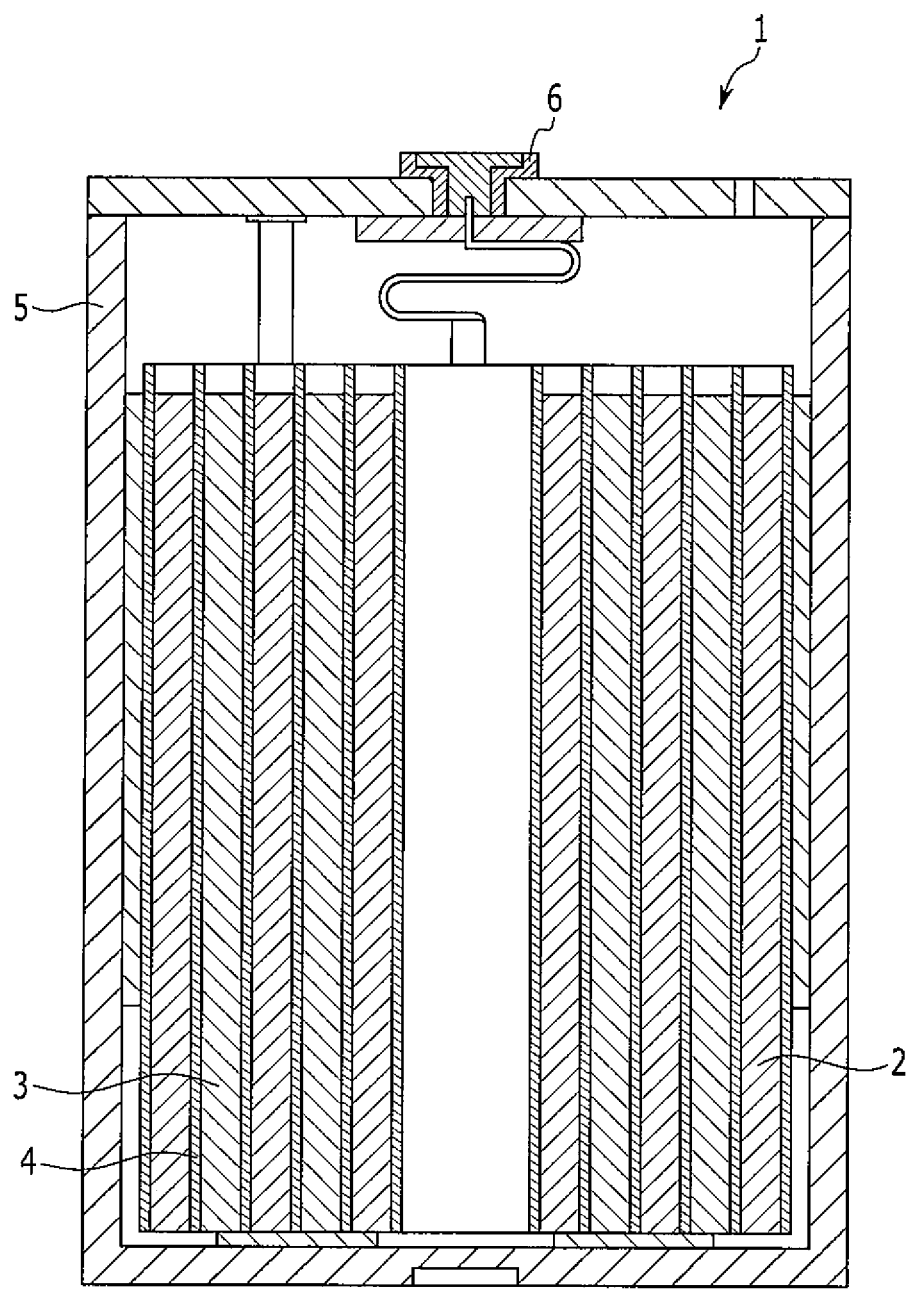
FIG. 1 is an exploded perspective view showing a rechargeable lithium battery according to one embodiment.

Hereinafter, embodiments are described in detail. However, these embodiments are exemplary, and this disclosure is not limited thereto. As those skilled in the art would realize, the described embodiments may be modified in various different ways, all without departing from the spirit or scope of the present invention. Further, the use of "may"

when describing embodiments of the present invention refers to "one or more embodiments of the present invention."

A negative active material for a rechargeable lithium battery according to one embodiment includes a silicon-based material, wherein the silicon-based material includes $SiO_x$ (0<x<2) particles and a Si—Fe-containing alloy positioned on the surface of the $SiO_x$ (0<x<2) particles.

The Si—Fe-containing alloy may be positioned on the surface of the $SiO_x$ (0<x<2) particles in a discontinuous form, and may be, for example formed partially in a form of an island.

When the silicon-based material is used as a negative active material for a rechargeable lithium battery, high capacity and excellent cycle-life characteristics may be provided due to the $SiO_x$ particles, and excellent efficiency characteristics may be provided due to the Si—Fe-containing alloy. That is to say, the silicon-based material may improve high-capacity characteristics, cycle-life characteristics, and efficiency characteristics of the rechargeable lithium battery simultaneously.

In some embodiments, the Si—Fe-containing alloy activates the surface of the $SiO_x$ particles and thus, may form $FeSi_2$ matrix having high mechanical strength or a stable SiO, due to a bond of Si or O with Fe. In addition, the $FeSi_2$ matrix has excellent electrical conductivity and small irreversibility and thus has high initial efficiency and may improve cycle-life characteristics of the rechargeable lithium battery. In some embodiments, the $FeSi_2$ matrix has a free volume, which plays a role of a buffer and prevents against volume expansion of Si.

In addition, the silicon-based material according to one embodiment may be prepared in a mechanical alloying method, and the Si—Fe-containing alloy obtained via this method may become amorphous on the surface of the $SiO_x$ particles. When the amorphous Si—Fe-containing alloy is present on the surface of the $SiO_x$ particles, no grain boundary is formed and generation of cracks during contraction and expansion of the Si may be prevented.

The silicon-based material may include about 20 wt % to about 95 wt % of the $SiO_x$ (0<x<2) particles, and about 5 wt % to about 80 wt % of the Si—Fe-containing alloy, and in some embodiments about 20 wt % to about 90 wt % of the $SiO_x$ particles and about 10 wt % to about 80 wt % of the Si—Fe-containing alloy, and in some embodiments about 20 to about 80 wt % of the SiO, particles and about 20 wt % to about 80 wt % of the Si—Fe-containing alloy, and in some embodiments about 50 wt % to about 80 wt % of the $SiO_x$ particles and about 20 to about 50 wt % of the Si—Fe-containing alloy.

The Si—Fe-containing alloy further includes Si particles. The amount the amount of the Si particles may be a trace amount. When the $SiO_x$ particles and the Si—Fe-containing alloy are included within these ratio ranges, the Si—Fe-containing alloy has excellent current dependency and realizes excellent initial efficiency, since nano Si or amorphous Si is present inside the Si—Fe-containing alloy. In addition, in some embodiments $FeSi_2$ has a stable phase and may minimize an electrolyte decomposition reaction and prevent formation of a thick side reactant layer on the surface of an active material and thus, minimize irreversibility by a resistance film. When the active material is contracted and expanded during repetitive charges and discharges and cracked, the active material may maintain excellent cycle-life due to a reversible phase such as Si, SiO, and the like, even though the internal structure of the active material, $SiO_x$, is exposed outside.

The $SiO_x$ particles may be amorphous and have excellent cycle-life characteristics.

An average particle diameter of the $SiO_x$ (0<x<2) particles may be from about 1 μm to about 70 μm, and in some embodiments from about 3 μm to about 50 μm, and in some embodiments from about 5 μm to about 40 μm. When the $SiO_x$ particles have an average particle diameter within these ranges, volume expansion may be suppressed during the charge and discharge, further improving cycle-life characteristics.

The Si—Fe-containing alloy may include a Si—Fe alloy, a Si—Fe—O alloy, a Si—Fe—Cu alloy, a Si—Fe—Sn alloy, a Si—Fe—Al alloy, a Si—Ti—Fe alloy, a Si—Ti—Ni—Fe alloy, a Si—Ti—Ni—Cu—Fe alloy, a Si—Fe—C alloy, a Si—Fe—Cu—C alloy, a Si—Fe—Sn—C alloy, or a combination thereof.

The silicon-based material may have a particle size ranging from about 3 μm to about 70 μm, and in some embodiments from about 5 μm to about 40 μm. When the silicon-based material has a particle size within these ranges, the silicon-based material may minimize an electrolyte decomposition reaction and suppress formation of a thick side reactant layer on the surface of the active material and thus, prevent deterioration of cycle-life due to increased resistance, as well as decrease generation of cracks on the active material due to contraction and expansion of the active material during repetitive charges and discharges and thus, may maintain a cycle-life, even if the cracks are generated.

The silicon-based material may be prepared by mixing the $SiO_x$ particles and the Si—Fe-containing alloy in a mechanical alloying method. In some embodiments, the silicon-based material may be prepared by coating the Si—Fe-containing alloy on the surface of the $SiO_x$ particles in the mechanical alloying method. The Si—Fe-containing alloy may further include a Si particle.

The mechanical alloying method, unlike a method of vapor deposition or fusion and rapid cooling, is a method of alloying through a physical impact by using a ball or the like. Herein, raw powders for alloying are put in a container with a ball and rolled with the ball; become broken by collision and shear and cold-welded and then, alloyed and solidified by decreasing its grain size and transforming its lattice, as the alloying process proceeds for several tens of hours. The mechanical alloying method may make the grain size of the raw powders for alloying into several nano sizes or the raw powders may become amorphous depending on duration of the process and thus, may accomplish uniform attaching and coating.

The size of the Si particle is about several nm to several tens nm. When the Si particle (grain) becomes larger, cycle-life characteristics may decrease due to volume expansion. According to one embodiment, the Si particle is coated by a mechanical alloying method but not heat-treated at a high temperature and thus, a grain size does not increase. In some embodiments, in the Si—Fe-containing alloy, the mechanical alloying method provides an amorphous Si and thus, may prevent generation of cracks during contraction and expansion of the Si.

The Si particle may be amorphous Si, crystalline Si, or a combination thereof.

A mixing ratio of the $SiO_x$ particles and the Si—Fe-containing alloy may be the same as described above.

The negative active material may further include a carbon-based material besides the silicon-based material.

When the silicon-based material and the carbon-based material are mixed, the negative active material may include about 1 wt % to about 99 wt % of the silicon-based material and about 1 wt % to about 99 wt % of the carbon-based material, and in some embodiments about 1 wt % to about 50 wt % of the silicon-based material and about 50 wt % to about 99 wt % of the carbon-based material.

The carbon-based material may be any carbon-based negative active material suitable for use in a lithium ion rechargeable battery, and non-limiting examples thereof include crystalline carbon, amorphous carbon, or mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, fired coke, or the like.

When a material having a small volume change during the charge and discharge, such as graphite, is used as the carbon-based material, an electrical conductivity path generated by the volume change of the $SiO_x$ particles during the charge and discharge may be secured.

Hereinafter, a rechargeable lithium battery including the negative active material is described referring to FIG. 1.

FIG. 1 is an exploded perspective view of a rechargeable lithium battery according to one embodiment.

Referring to FIG. 1, the rechargeable lithium battery 1 includes an electrode assembly including a positive electrode 2, a negative electrode 3, and a separator 4 between the positive electrode 2 and the negative electrode 3, in a battery case 5, an electrolyte injected through the upper part of the case 5, and a cap plate 6 sealing the battery. The rechargeable lithium battery according to one embodiment is not limited to the shape in FIG. 1, and it may be formed in diverse shapes such as a cylindrical shape, a coin-type shape, or a pouch shape as long as it includes the negative active material for a rechargeable lithium battery and operates as a battery.

In some embodiments, the negative electrode 3 includes a current collector and a negative active material layer formed on the current collector, and the negative active material layer includes the negative active material as described above, and optionally a binder, a conductive material, or the like.

In some embodiments of the present invention, the binder improves binding properties of the negative active material particles with one another and with a current collector. The binder includes a non-water-soluble binder, a water-soluble binder, or a combination thereof.

The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof. The water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof. When the water-soluble binder is used as a negative electrode binder, a cellulose-based compound may be further used to provide viscosity. The cellulose-based compound includes one or more of carboxymethyl cellulose, hydroxypropylmethyl cellulose, methyl cellulose, or alkali metal salts thereof. The alkali metal may be Na, K, or Li. The cellulose-based compound may be included in an amount of about 0.1 parts by weight to about 3 parts by weight based on 100 parts by weight of the negative active material.

In some embodiments, the conductive material improves conductivity of an electrode. Any electrically conductive material may be used as a conductive material, unless it causes a chemical change in the battery. Non-limiting examples of the conductive material include a carbon-based material such as natural graphite, artificial graphite, carbon black, acetylene black, ketjen black, carbon fiber, or the like; a metal-based material of metal powder or metal fiber including copper, nickel, aluminum, silver, or the like; a conductive polymer such as a polyphenylene derivative or the like; or a mixture thereof.

The current collector may use one selected from a copper foil, a nickel foil, a stainless steel foil, a titanium foil, a nickel foam, a copper foam, a polymer substrate coated with a conductive metal, or a combination thereof.

The positive electrode 2 may include a current collector and a positive active material layer formed on the current collector.

The positive active material layer may include a positive active material, and the positive active material may include lithiated intercalation compounds that reversibly intercalate and deintercalate lithium ions. In some embodiments, the positive active material may include a composite oxide including a metal selected from cobalt, manganese, nickel, or a combination thereof, and lithium. Non-limiting examples include a compound represented by one of the following chemical formulae. $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_c D_\alpha$(0.90≤a≤1.8, 0≤b≤0.5, 0≤c≤0.05, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$ In the above chemical formulae, A is selected from Ni, Co, Mn, or a combination thereof; X is selected from Al, Ni, Co, Mn, Cr, Fe, Mg, Sr, V, a rare earth element, or a combination thereof; D is selected from O, F, S, P, or a combination thereof; E is selected from Co, Mn, or a combination thereof; T is selected from F, S, P, or a combination thereof; G is selected from Al, Cr, Mn, Fe, Mg, La, Ce, Sr, V, or a combination thereof; Q is selected from Ti, Mo, Mn, or a combination thereof; Z is selected from Cr, V, Fe, Sc, Y, or a combination thereof; and J is selected from V, Cr, Mn, Co, Ni, Cu, or a combination thereof.

The positive active material may include the positive active material with the coating layer, or a compound of the positive active material and the positive active material coated with the coating layer. The coating layer may include at least one coating element compound selected from the group consisting of an oxide of the coating element, a hydroxide of the coating element, an oxyhydroxide of the coating element, an oxycarbonate of the coating element, and a hydroxycarbonate of the coating element. The coating element compound for the coating layer may be either amorphous or crystalline. The coating element included in the coating layer may be selected from Mg, Al, Co, K, Na, Ca, Si, Ti, V, Sn, Ge, Ga, B, As, Zr, or a mixture thereof. The coating process may include any conventional coating process as long as it does not causes any side effects on the properties of the positive active material (e.g., spray coating, immersing). Conventional coating processes are well known to persons having ordinary skill in this art, so a detailed description thereof will not be provided.

The positive active material layer may include a binder, a conductive material, or the like.

In some embodiments, the binder improves binding properties of the positive active material particles with one another and with a current collector. Non-limiting examples of the binder include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but are not limited thereto.

In some embodiments, the conductive material improves conductivity of an electrode. Any electrically conductive material may be used as a conductive material, unless it causes a chemical change in the battery. Non-limiting examples of the conductive material include a carbon-based material such as natural graphite, artificial graphite, carbon black, acetylene black, ketjen black, carbon fiber or the like; a metal-based material such as a metal powder or a metal fiber or the like of copper, nickel, aluminum, silver, or the like; a conductive polymer such as a polyphenylene derivative or the like; or a mixture thereof.

The current collector may use an Al foil, but is not limited thereto.

The negative electrode and the positive electrode may be manufactured by a method including mixing an active material, a conductive material, and a binder into an active material composition and coating the composition on a current collector. The electrode manufacturing method is well known, and thus is not described in detail in the present specification. The solvent typically includes N-methylpyrrolidone and the like, but is not limited thereto.

In some embodiments, the electrolyte solution includes a non-aqueous organic solvent and a lithium salt.

In some embodiments, the non-aqueous organic solvent serves as a medium for transmitting ions taking part in the electrochemical reaction of a battery. The non-aqueous organic solvent may be selected from a carbonate-based, ester-based, ether-based, ketone-based, alcohol-based, or aprotic solvent.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like.

When the linear carbonate compounds and cyclic carbonate compounds are mixed, an organic solvent having a high dielectric constant and a low viscosity may be provided. In some embodiments, the cyclic carbonate and the linear carbonate are mixed together in a volume ratio ranging from about 1:1 to 1:9.

In addition, the ester-based solvent may be, for example, methylacetate, ethylacetate, n-propylacetate, dimethylacetate, methylpropionate, ethylpropionate, γ-butyrolactone, decanolide, valerolactone, mevalonolactone, caprolactone, or the like. The ether solvent may be, for example, dibutylether, tetraglyme, diglyme, dimethoxyethane, 2-methyltetrahydrofuran, tetrahydrofuran, or the like, and the ketone-based solvent may be cyclohexanone, or the like. In addition, the alcohol based solvent may be ethanol, isopropyl alcohol, or the like.

The non-aqueous organic solvent may be used alone or in a mixture, and when the non-aqueous organic solvent is used in a mixture, the mixture ratio may be controlled in accordance with a desirable battery performance.

The non-aqueous electrolyte may further include an overcharge inhibitor additive such as ethylenecarbonate, pyrocarbonate, or the like.

In some embodiments, the lithium salt is dissolved in an organic solvent, supplies lithium ions in a battery, improves lithium ion transportation between positive and negative electrodes, and basically operates the rechargeable lithium battery.

Non-limiting examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$ (lithium bis(oxalato) borate, LiBOB), or a combination thereof.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

The separator 4 may include any materials suitable for use in a conventional lithium battery as long as these materials can separate the negative electrode from the positive electrode and provide a transporting passage for lithium ions. In other words, the separator 4 may have a low resistance to ion transportation and an excellent impregnation for an electrolyte. For example, the separator may be selected from glass fiber, polyester, tetrafluoroethylene, polyethylene, polypropylene, polytetrafluoroethylene (PTFE), or a combination thereof. It may have a form of a non-woven fabric or a woven fabric. For example, a polyolefin-based polymer separator such as polyethylene, polypropylene or the like may be used for a lithium ion battery. In order to ensure the heat resistance or mechanical strength, a coated separator including a ceramic component or a polymer material may be used. In some embodiments, the coated separator may have a mono-layered or multi-layered structure.

The following examples illustrate the present invention in more detail. These examples, however, should not in any sense be interpreted as limiting the scope of the present invention.

(Manufacture of Silicon-Based Material)

EXAMPLE 1

A silicon-based material was prepared by putting 20 wt % of an amorphous $SiO_{0.8}$ particle having an average particle diameter of 5 μm and 80 wt % of a Si—Fe alloy (Si:Fe=30:70 in a weight ratio) in an attrition mill as a mechanical alloying device to coat the Si—Fe alloy on the surface of the $SiO_{0.8}$ particle. Herein, the silicon-based material had a particle size of 50 μm based on a laser radiation particle diameter analysis, and the Si—Fe alloy was positioned on the surface of the $SiO_{0.8}$ particle, in the form of an island.

EXAMPLE 2

A silicon-based material was prepared according to the same method as in Example 1 except for using 50 wt % of the $SiO_{0.8}$ particle and 50 wt % of the Si—Fe alloy (Si:Fe=30:70 in a weight ratio). Herein, the silicon-based material had a particle size of 30 μm, and the Si—Fe alloy was positioned on the surface of the $SiO_{0.8}$ particle, in the form of an island.

EXAMPLE 3

A silicon-based material was prepared according to the same method as in Example 1 except for using 70 wt % of the $SiO_{0.8}$ particle and 30 wt % of the Si—Fe alloy (Si:Fe=30:70 in a weight ratio). Herein, the silicon-based material had a particle size of 20 μm, and the Si—Fe alloy was positioned on the surface of the $SiO_{0.8}$ particle, in the form of an island.

EXAMPLE 4

A silicon-based material was prepared according to the same method as in Example 1 except for using 80 wt % of the $SiO_{0.8}$ particle and 20 wt % of the Si—Fe alloy (Si:Fe=30:70 in a weight ratio). Herein, the silicon-based material had a particle size of 13 μm, and the Si—Fe alloy was positioned on the surface of the $SiO_{0.8}$ particle, in the form of an island.

EXAMPLE 5

A silicon-based material was prepared according to the same method as in Example 1 except for using 90 wt % of the $SiO_{0.8}$ particle and 10 wt % of the Si—Fe alloy (Si:Fe=30:70 in a weight ratio). Herein, the silicon-based material had a particle size of 7 μm, and the Si—Fe alloy was positioned on the surface of the $SiO_{0.8}$ particle, in the form of an island.

COMPARATIVE EXAMPLE 1

An amorphous $SiO_{0.8}$ particle having an average particle diameter of 5 μm was used as a silicon-based material.

COMPARATIVE EXAMPLE 2

A Si—Fe alloy (Si:Fe=30:70 in a weight ratio) as a silicon-based material was used.
(Manufacture of Rechargeable Lithium Battery Cell)
20 wt % of each of the silicon-based materials according to Examples 1 to 5 and Comparative Examples 1 and 2, 77 wt % of graphite, 1.5 wt % of carboxymethyl cellulose, and 1.5 wt % of a styrene-butadiene rubber were mixed in distilled water, preparing a slurry. The slurry was coated on a Cu foil as a current collector, dried, and compressed, manufacturing a negative electrode.

The negative electrode and a lithium metal as a counter electrode for the negative electrode were put in a battery case, and an electrolyte solution was injected therein, manufacturing a rechargeable lithium battery cell. Herein, the electrolyte solution was prepared by mixing ethylenecarbonate (EC), diethylcarbonate (DEC), and fluoroethylenecarbonate (FEC) in a volume ratio of 5:70:25 and dissolving 1.5 M $LiPF_6$ in the mixed solution.
Evaluation 1: Cycle-Life Characteristics of Rechargeable Lithium Battery Cell Cycle-life characteristics of each rechargeable lithium battery cell manufactured by respectively using the silicon-based materials according to Examples 1 to 5 and Comparative Examples 1 and 2 were evaluated by performing charge and discharge under the following conditions, and the results are provided in FIGS. 2 and 3.

The rechargeable lithium battery cell was formation charged and discharged as follows:
The rechargeable lithium battery cell was charged up to a voltage of 0.01V (vs. Li) with a current of a 0.2C at 25° C. under a constant current and charged under a constant voltage until the current reached 0.01C while the 0.01V was maintained. Subsequently, the rechargeable lithium battery cell was discharged with a constant current of 0.2C until the voltage reached 1.5V (vs. Li) during the discharge. Then, the rechargeable lithium battery cell was charged with a current of a 0.5C under a constant current until the voltage reached 0.01V (vs. Li) and charged under a constant voltage until the current reached 0.01C while the 0.01V was maintained. Subsequently, the rechargeable lithium battery cell was discharged with a constant current of 0.5C until the voltage reached 1.5V (vs. Li) during the discharge.

The rechargeable lithium battery cell through the formation process was charged at 25° C. with a current of a 1.0C under a constant current until the voltage reached 0.01V (vs. Li) and charged under a constant voltage until the current reached 0.01C while the 0.01V was maintained. Subsequently, the rechargeable lithium battery cell was discharged with a constant current of 1.0C until the voltage reached 1.5V (vs. Li) during the discharge, and this cycle was repeated 100 times.

Figure 2:
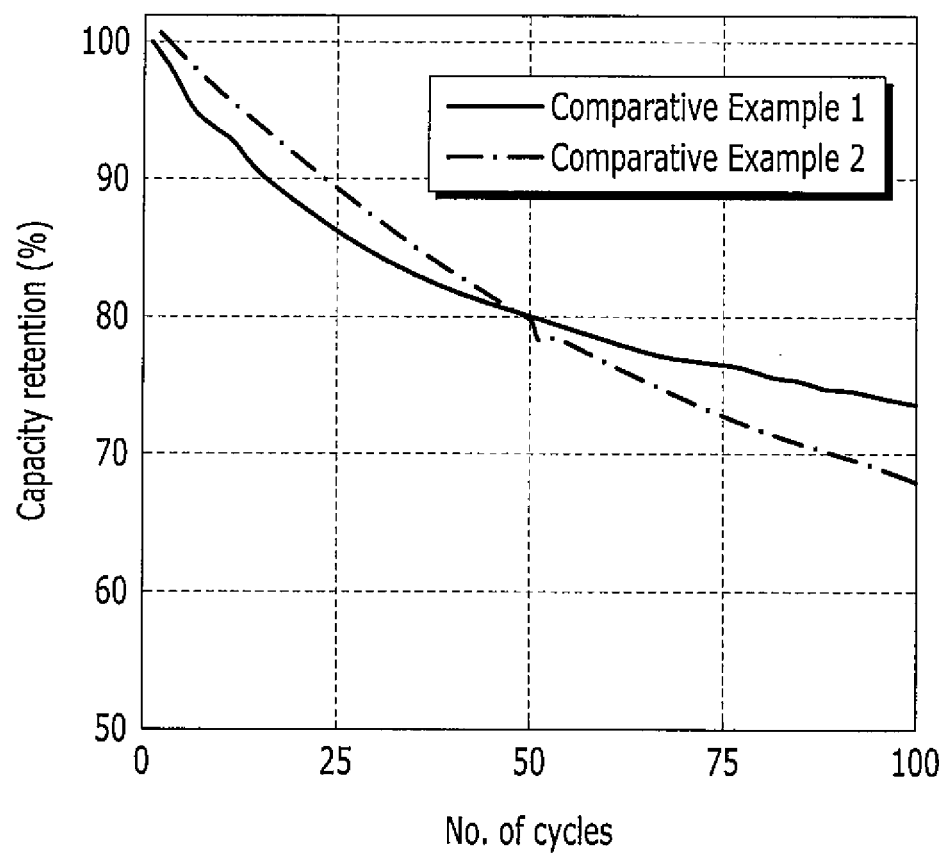
FIG. 2 is a graph showing capacity retention of rechargeable lithium battery cells according to Comparative Examples 1 and 2 during repeated cycles.
Figure 3:
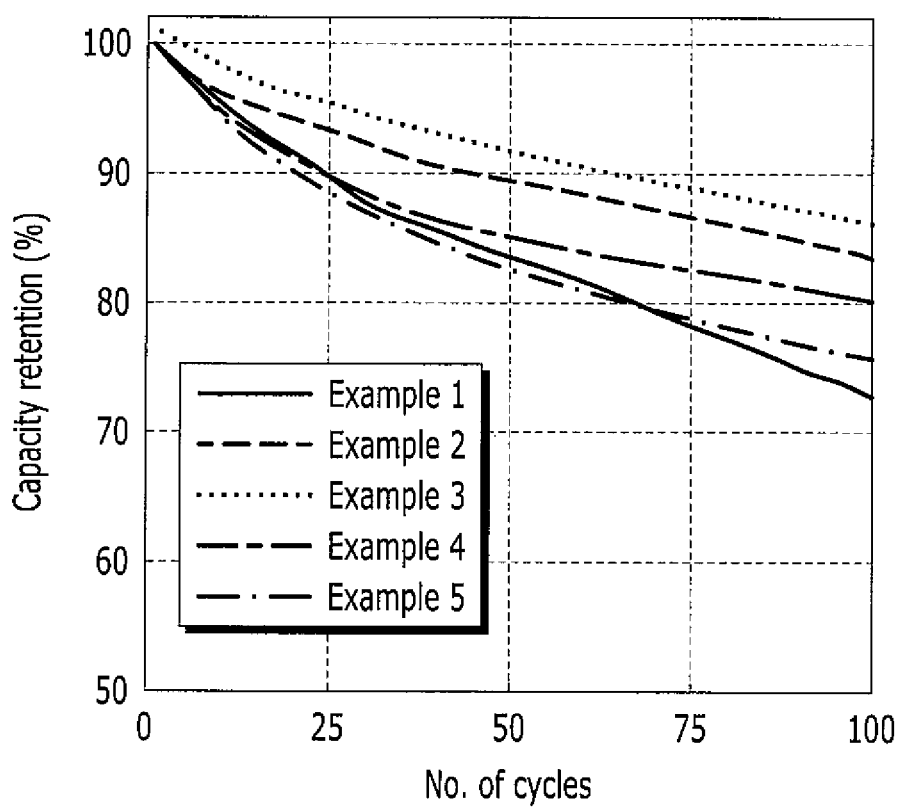
FIG. 3 is a graph showing capacity retention of rechargeable lithium battery cells according to Examples 1 to 5 during repeated cycles.

FIG. 2 is a graph showing capacity retention change of the rechargeable lithium battery cells according to Comparative Examples 1 and 2 depending on a cycle, while FIG. 3 is a graph showing capacity retention change of the rechargeable lithium battery cells according to Examples 1 to 5 depending on a cycle.

Referring to FIGS. 2 and 3, Examples 1 to 5 using a silicon-based material including $SiO_x$ particles coated with a Si—Fe alloy on the surface of the $SiO_x$ particles showed improved cycle-life characteristics compared with Comparative Example 2 using a silicon-based material including only a Si—Fe alloy.

On the other hand, Comparative Example 1 using a silicon-based material including only $SiO_x$ particles showed excellent cycle-life characteristics due to characteristics of the $SiO_x$ particles. However, Comparative Example 1 using only the $SiO_x$ particles showed deteriorated efficiency characteristics as shown in Evaluation 3, and accordingly, both cycle-life and efficiency characteristics were not simultaneously improved in either Comparative Example 1 or Comparative Example 2.

Accordingly, when a silicon-based material according to one embodiment is used as a negative active material, excellent cycle-life and efficiency characteristics may be simultaneously obtained.
Evaluation 2: Efficiency Characteristics of Rechargeable Lithium Battery Cells Efficiency characteristics of the rechargeable lithium battery cells respectively using the silicon-based materials according to Examples 1 to 5 and Comparative Examples 1 and 2 were evaluated by charging and discharging the rechargeable lithium battery cells under the following conditions, and the results are provided in Table 1.

The rechargeable lithium battery cells were charged at 25° C. with a current of a 0.2C under a constant current until the voltage reached 0.01V (vs. Li) and then, charged under a constant voltage until the current reached 0.01C while the 0.01V was maintained. Subsequently, the rechargeable lithium battery cells were discharged with a constant current of 0.2C until the voltage reached 1.5V (vs. Li).

Then, the rechargeable lithium battery cells were charged with a current of a 0.5C under a constant current until the voltage reached 0.01V (vs. Li) and then, charged under a constant voltage until the current reached 0.01C while the 0.01V was maintained. Subsequently, the rechargeable lithium battery cells were discharged with a constant current of 0.5C until the voltage reached 1.5V (vs. Li) during the discharge (a formation step).

The rechargeable lithium battery cells through the formation process were charged at 25° C. with a current of a 1.0C under a constant current until the voltage reached 0.01V (vs. Li) and charged under a constant voltage until the current reached 0.01C while the 0.01V was maintained. Subsequently, the rechargeable lithium battery cells were discharged with a constant current of 1.0C until the voltage reached 1.5V (vs. Li) during the discharge, and this cycle was repeated 100 times.

TABLE 1

|  | Initial efficiency (%) |
| --- | --- |
| Comparative Example 1 | 78.4 |
| Comparative Example 2 | 91.2 |
| Example 1 | 90.8 |
| Example 2 | 89.4 |
| Example 3 | 87.2 |
| Example 4 | 85.3 |
| Example 5 | 82.2 |

Referring to Table 1, Examples 1 to 5 using $SiO_x$ particles coated with a Si—Fe alloy on the surface as a silicon-based material showed improved efficiency characteristics compared with Comparative Example 1 using only $SiO_x$ particles as the silicon-based material.

On the other hand, Comparative Example 2 using a Si—Fe alloy as a silicon-based material showed excellent efficiency characteristics due to characteristics of the Si—Fe alloy. However, Comparative Example 2 using only a Si—Fe alloy showed deteriorated cycle-life characteristics as shown in Evaluation 1, and both cycle-life and efficiency characteristics were not simultaneously improved in either Comparative Example 1 or Comparative Example 2.

Accordingly, when the silicon-based material according to embodiments of the present invention was used as a negative active material, excellent cycle-life and efficiency characteristics were simultaneously obtained.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A negative active material for a rechargeable lithium battery, comprising a silicon-based material comprising $SiO_x$ particles, where $0<x<2$, and
a Si—Fe-containing alloy positioned on the surface of the $SiO_x$ particles,
wherein the silicon-based material comprises from about 30 wt % to about 80 wt % of the Si—Fe-containing alloy.

2. The negative active material for a rechargeable lithium battery of claim 1, wherein the Si—Fe-containing alloy is positioned on the surface of the $SiO_x$ particles in a discontinuous form.

3. The negative active material for a rechargeable lithium battery of claim 1, wherein the silicon-based material comprises:
from about 20 wt % to about 70 wt % of the $SiO_x$ particles.

4. The negative active material for a rechargeable lithium battery of claim 1, wherein the silicon-based material comprises:
from about 50 wt % to about 70 wt % of the $SiO_x$ particle, and
from about 30 wt % to about 50 wt % of the Si—Fe-containing alloy.

5. The negative active material for a rechargeable lithium battery of claim 1, wherein the $SiO_x$ particles are amorphous.

6. The negative active material for a rechargeable lithium battery of claim 1, wherein an average particle diameter of the $SiO_x$ particles is from about 1 μm to about 70 μm.

7. The negative active material for a rechargeable lithium battery of claim 1, wherein the Si—Fe-containing alloy comprises a Si—Fe alloy, a Si—Fe—O alloy, a Si—Fe—Cu alloy, a Si—Fe—Sn alloy, a Si—Fe—Al alloy, a Si—Ti—Fe alloy, a Si—Ti—Ni—Fe alloy, a Si—Ti—Ni—Cu—Fe alloy, a Si—Fe—C alloy, a Si—Fe—Cu—C alloy, a Si—Fe—Sn—C alloy, or a combination thereof.

8. The negative active material for a rechargeable lithium battery of claim 1, wherein a particle size of the silicon-based material is about 3 μm to about 70 μm.

9. The negative active material for a rechargeable lithium battery of claim 1, wherein the negative active material further comprises a carbon-based material.

10. The negative active material for a rechargeable lithium battery of claim 9, wherein the silicon-based material is included in an amount of about 1 wt % to about 99 wt % based on the total amount of the negative active material.

11. The negative active material for a rechargeable lithium battery of claim 1, wherein the Si—Fe-containing alloy further comprises Si particles.

12. A negative electrode for a rechargeable lithium battery comprising the negative active material according to claim 1.

13. A rechargeable lithium battery, comprising
the negative electrode according to claim 12;
a positive electrode; and
an electrolyte solution.

* * * * *